US010834947B2

(12) United States Patent
Rognini et al.

(10) Patent No.: US 10,834,947 B2
(45) Date of Patent: Nov. 17, 2020

(54) SYSTEM FOR MAKING A FOOD PRODUCT HAVING A MEAT-BASED LAYER

(71) Applicant: TYSON FOODS ITALIA SPA, Verona (IT)

(72) Inventors: Pietro Rognini, Bardolino (IT); Guus Burbank, Nijeveen (NL)

(73) Assignee: TYSON FOODS ITALIA SPA, Verona (IT)

( * ) Notice: Subject to any disclaimer, the term of this patent is extended or adjusted under 35 U.S.C. 154(b) by 0 days.

(21) Appl. No.: 16/062,338

(22) PCT Filed: Dec. 15, 2016

(86) PCT No.: PCT/IB2016/057636
§ 371 (c)(1),
(2) Date: Jun. 14, 2018

(87) PCT Pub. No.: WO2017/103826
PCT Pub. Date: Jun. 22, 2017

(65) Prior Publication Data
US 2018/0368450 A1    Dec. 27, 2018

(30) Foreign Application Priority Data
Dec. 15, 2015   (IT) .................. 102015000083395

(51) Int. Cl.
*A23L 13/00*   (2016.01)
*A23P 20/20*   (2016.01)
(Continued)

(52) U.S. Cl.
CPC ............ *A23L 13/03* (2016.08); *A22C 7/0007* (2013.01); *A23L 5/10* (2016.08); *A23L 13/62* (2016.08);
(Continued)

(58) Field of Classification Search
CPC .. A23L 13/03; A23L 13/62; A23L 5/10; A23P 20/12; A23P 20/20; A22C 7/0007
See application file for complete search history.

(56) References Cited

U.S. PATENT DOCUMENTS

RE24,835 E  *  6/1960  Christianson et al. .. A23B 4/32
                                                    426/289
4,675,197 A  *  6/1987  Banner ................... A23P 20/12
                                                    426/243
(Continued)

FOREIGN PATENT DOCUMENTS

EP   2359697 A2   8/2011
EP   2481295 A1   8/2012

OTHER PUBLICATIONS

Derwent Abstract for KR1392403 published May 2014.*
International Search Report from PCT/IB2016/057636 dated Mar. 14, 2017 (14 pages).

*Primary Examiner* — Anthony J Weier
(74) *Attorney, Agent, or Firm* — Calfee, Halter & Griswold LLP (57) ABSTRACT

Food product having a meat-based layer, an impermeable covering layer disposed on the whole surface of a meat-based layer with a first side, a second side and one or more connection edges defined between the first and second sides, a layer of batter that covers only the first side and at least part of connection edges of the meat-based layer, a breaded layer distributed on at least part of the layer of batter, and, in case, a garnish distributed on at least part of the surface of the meat-based layer covered with the impermeable covering layer and left uncovered by the layer of batter and the breaded layer. The invention concerns also the apparatus to make said food product and the corresponding method.

9 Claims, 3 Drawing Sheets

(51) Int. Cl.
  *A22C 7/00* (2006.01)
  *A23P 20/12* (2016.01)
  *A23L 5/10* (2016.01)
  *A23L 13/60* (2016.01)
  *A23P 20/10* (2016.01)

(52) U.S. Cl.
  CPC .............. *A23P 20/11* (2016.08); *A23P 20/12* (2016.08); *A23P 20/20* (2016.08)

(56) References Cited

U.S. PATENT DOCUMENTS

| | | |
|---|---|---|
| 5,057,329 A | 10/1991 | Stypula et al. |
| 5,770,252 A | 6/1998 | McEwen et al. |
| 8,678,886 B1 * | 3/2014 | Nothum, Jr. ............ A22C 25/08 |
| | | 452/181 |
| 2010/0310712 A1 * | 12/2010 | Ashourian .............. A23L 19/00 |
| | | 426/7 |
| 2012/0196005 A1 | 8/2012 | Pickford |

* cited by examiner fig. 1 fig. 2a fig. 2b fig. 2c fig. 3 fig. 4 ial Application
SYSTEM FOR MAKING A FOOD PRODUCT HAVING A MEAT-BASED LAYER

CROSS-REFERENCE TO RELATED APPLICATION

This application is the U.S. national phase entry of PCT/IB2016/057636, with an international filing date of 15 Dec. 2016, which claims the benefit of Italian Application Serial No. 102015000083395, with a filing date of 15 Dec. 2015, the entire disclosures of which are fully incorporated herein by reference.

FIELD OF THE INVENTION

The present invention concerns a meat-based food product, the apparatus and corresponding method to obtain it.

In particular, the invention is applied to the production of a precooked food product, breaded and frozen, to be put on sale.

BACKGROUND OF THE INVENTION

In the field of food products, it is known that one of the advantages of precooked food products is that a meal or a portion of meal can be available, ready in a short time, since they do not need complete cooking but only to be heated and/or have the cooking finished.

Many precooked food products are known, based on meat, vegetables, cheese or a combination thereof, which, to meet the requirements of practicality and to please the final consumers, are covered by a breaded layer.

However, it is also known that consumers are increasingly attentive to nutritional aspects and to the preservation of the organoleptic characteristics and crispness of food products.

It is known that, during the precooking and/or cooking of such breaded foods, especially for those based on meat, after the liquids have emerged from the meat, the breaded layer becomes wet and tends to lose its crispness.

For example, documents US 2012/0196005 (US'005) and US 2009/0004339 (US'339) describe two methods to obtain a breaded food product with a breaded layer distributed on the entire surface of the core of the food product.

Since these documents disclose that the breaded food product is cooked only in a fryer, it is evident that, due to the liquid coming out from the core of the food product, the breaded layer is not uniformly cooked and tends to have one side wet and less crispness with respect to the other side.

Furthermore, after a conspicuous amount of liquids have emerged from the meat during precooking, in particular in the fryer, there is a sudden lowering of the temperature of the liquid used for frying, and this does not allow to have an optimum cooking of the food product.

It is known that, to have an optimum golden color of the breaded layer and at the same time to preserve the nutritional characteristics of the food product, without an excessive absorption of fats inside the meat, the frying liquid must maintain a constant temperature comprised between 160° C. and 200° C.

Once the breaded layer has been made wet by the liquids emitted by the meat, such known breaded products have reduced firmness and therefore the consumer has to eat them paying attention not to get dirty, and also not to lose part of the food product itself.

Furthermore, if the food product is very wet, it is necessary to cut the food product in order to obtain smaller mouthfuls, using suitable cutlery.

It is known that consumers therefore prefer to purchase food products that can easily be eaten on foot and/or walking and without the aid of cutlery, such as for example pizzas and/or bruschettas which, as is known, have firmer supports than known breaded meat-based products.

In particular, the extreme ease and facility with which frozen pizzas are eaten leads consumers, especially children, to prefer these products over meat-based ones, to such an extent that they eat considerable quantities of carbohydrates rather than the proteins and vitamins contained in meat, which are useful for growth.

There is therefore a need to perfect the state of the art and to make available a food product that overcomes at least one of the disadvantages of the state of the art.

There is also a need to make available an apparatus to obtain said food product and the corresponding method.

The present invention sets itself the purpose of obtaining a breaded meat-based food product, precooked and extremely crisp.

One purpose of the present invention is to provide a breaded meat-based food product which is not only easy to prepare, but is firm enough to be eaten even without the aid of cutlery, in the same way as known pizzas are eaten.

The inventive idea therefore allows to offer a food product which is full of protein, breaded, with high nutritional value, and such that it does not lose the liquids naturally contained in the meat itself, and which is also attractive and easy to handle.

Another purpose of the present invention is to supply an apparatus configured to obtain frozen food products, worked and/or semi-worked, suitable to be distributed and/or to be finished even in another apparatus and/or place, configured to receive and work the semi-worked products obtained.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, the present invention provides a food product which comprises at least:
- a meat-based layer, or a mixture of meats, with a first side, a second side and one or more connection edges defined between the first side and the second side;
- an impermeable covering layer disposed on the whole surface of the meat-based layer;
- a layer of batter that covers only the first side and at least part of the connection edges of the meat-based layer;
- a breaded layer distributed on at least part of the layer of batter.

According to a variant of the invention, the food product also comprises a garnish distributed on at least part of the surface of the meat-based layer covered with the impermeable covering layer and left uncovered by the batter and breaded layers.

According to a variant of the present invention, the meat-based layer comprises at least one type of meat to which other elements and/or stabilizers have also been added, and has a thickness comprised between 2 mm and 10 mm, preferably comprised between 3 mm and 6 mm.

According to the present invention, the method to obtain the food product comprises:

a step to take the meat or the mixture of meats;

a step to mold the mixture of meats to define a meat-based layer with a first side facing upward and a second side facing downward;

a step of covering the whole surface of the meat-based layer with an impermeable covering mixture;

a step of distributing a batter only on the first side, facing downward, and at least part of the connection edges of the meat-based layer until a layer of batter is obtained;

a breading step during which a combination of shredded ingredients are distributed at least on the layer of batter;

a frying step keeping the breaded layer facing downward;

a cooking step in an oven reaching a temperature inside the meat-based layer higher than 75° C. and keeping the breaded layer facing upward.

According to a variant of the invention, during the garnishing step one or more ingredients are distributed at least on part of the surface of the meat-based layer covered with the impermeable covering layer and left uncovered by the layer of batter and the breaded layer.

According to a variant of the present invention, the step of distributing the batter provides that the batter is distributed only on the first side, facing downward, and at least part of the connection edges of the meat-based layer.

According to one form of embodiment, the method provides that the garnishing step is carried out possibly in a different apparatus and/or place from where the previous steps are carried out.

According to one form of embodiment, the method provides that the molding step is combined with a step of flattering during which the meat-based layer is brought to the target thickness, shape and size.

According to the present invention, an apparatus is provided, able to obtain the food product with or without the garnish, which comprises:

a meat taking station, configured to take the meat, or the mixture of one or more types of meat, from one or more containers;

a molding station to mold a meat-based layer configured to shape the meat-based layer with the desired shape, size and thickness;

a covering station to cover the meat-based layer configured to distribute a covering mixture over the whole surface of the meat-based layer;

a breading preparation station, configured to distribute a layer of batter only on the first side, facing downward, and at least part of the connection edges of the meat-based layer;

a breading station configured to distribute shredded ingredients on the layer of batter;

a frying station configured to fry the food product keeping the breaded layer facing downward;

a cooking station in an oven configured to finish the cooking of the meat-based layer, keeping the breaded layer facing upward.

According to a variant of the present invention, the apparatus provides a garnishing station, also remote, configured to distribute the garnishing ingredients at least on the surface of the meat-based layer covered with the impermeable covering layer 13 and left uncovered by the layer of batter and the breaded layer.

According to one form of embodiment, the apparatus provides a freezing station to freeze the finished and/or semi-worked food product.

According to a variant of the invention, the breading preparation station is configured to distribute from below a layer of batter only on the first, downward-facing side and at least part of the connection edges of the meat-based layer.

According to one form of embodiment, the apparatus comprises a flattering station configured to bring said meat-based layer to the target thickness and to assure its target shape and size.

BRIEF DESCRIPTION OF THE DRAWINGS

These and other characteristics of the present invention will become apparent from the following description of some forms of embodiment, given as a non-restrictive example with reference to the attached drawings wherein.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME FORMS OF EMBODIMENTS

With reference to the drawings, which represent non-restrictive examples of the invention, we shall now describe forms of embodiment of a high-protein, breaded food product 10, an apparatus 11 to obtain it and the corresponding method.

Figure 1:
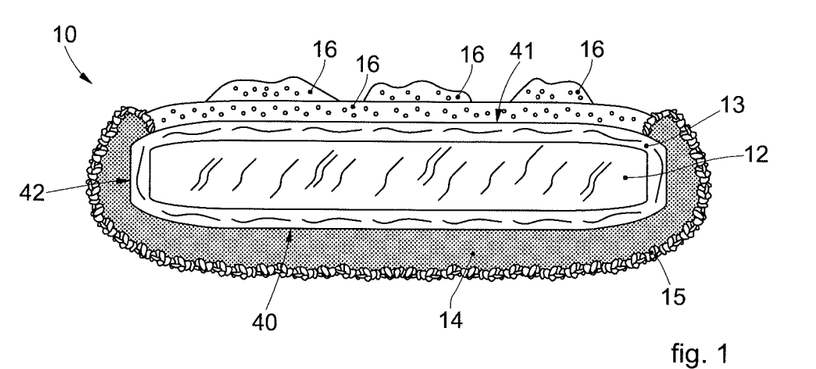
FIG. 1 shows a section of a food product according to the present invention.

According to the present invention, the food product 10 comprises a meat-based layer 12 having a first side 40 and a second side 41 between which a connection edge 42, an impermeable covering layer 13, a layer of batter 14, a breaded layer 15 and possibly a garnish 16 are defined.

According to one fox in of embodiment of the present invention, the food product 10, if it is obtained as a semi-finished product, may also possibly not comprise the garnish 16.

Figure 3:
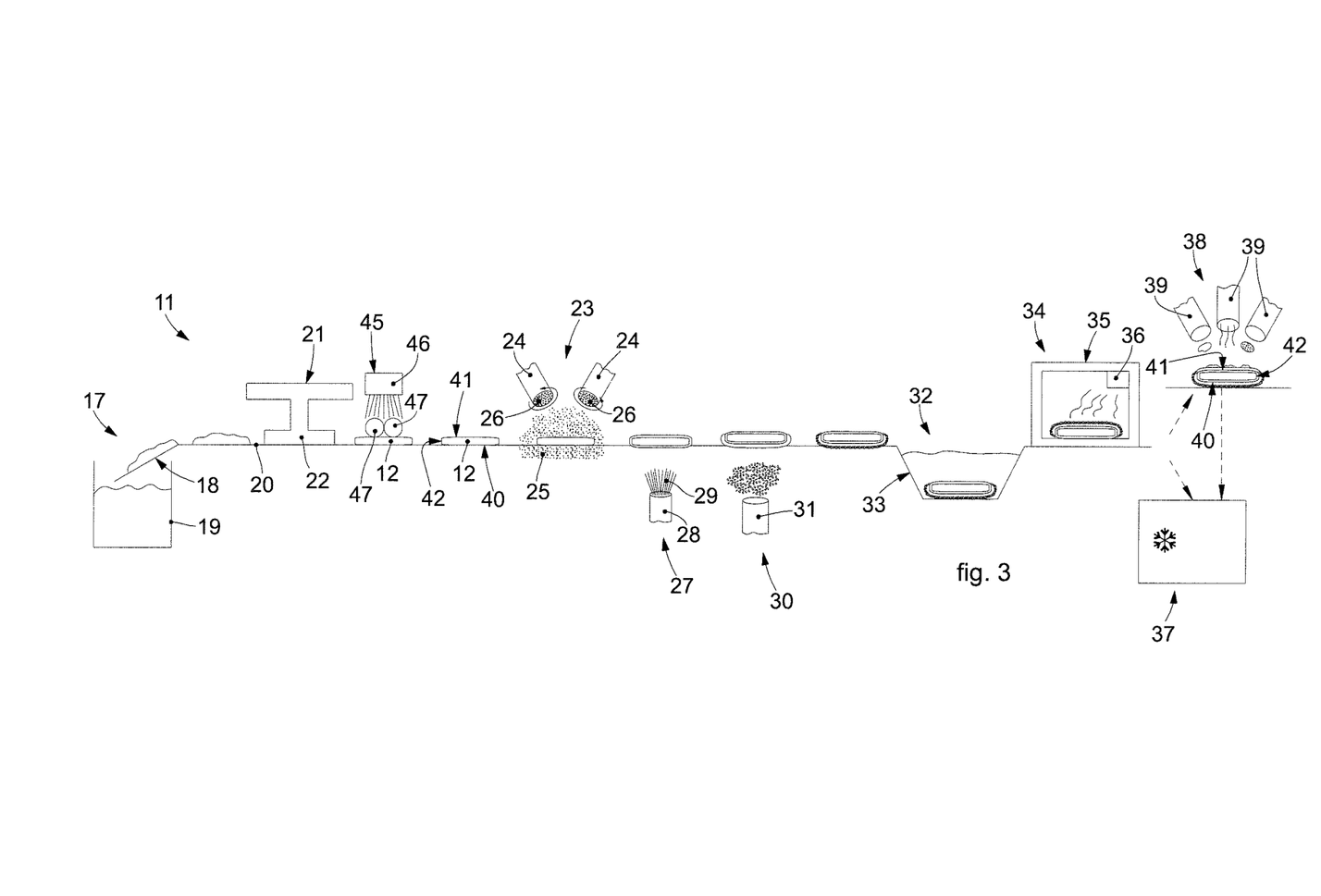
FIG. 3 shows a schematization of an apparatus to obtain the food product according to the present invention.
Figure 4:
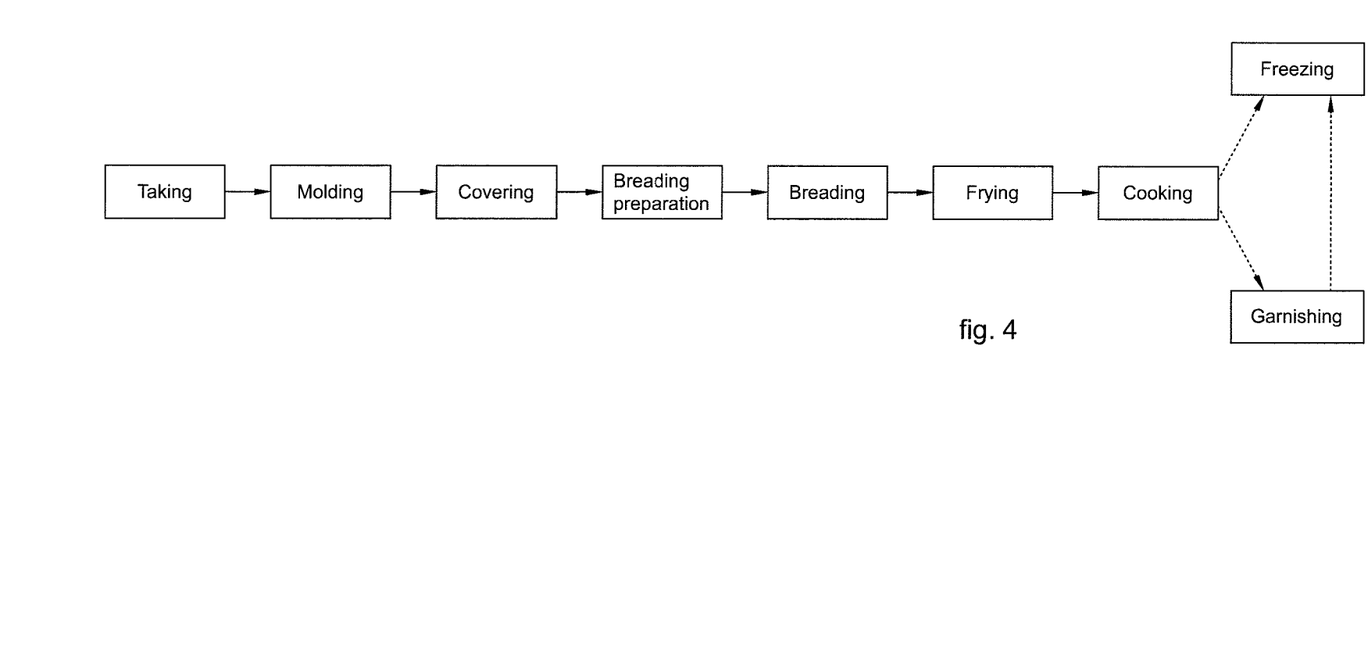
FIG. 4 shows a block diagram of a method to obtain a food product according to the present invention.

We shall now describe the characteristics of each individual layer, at the same time illustrating how they are obtained in the different stations of the apparatus 11 until the food product 10 is obtained with and without garnish 16.

According to the present invention, the meat-based layer 12 contains, by way of example, chicken and/or poultry and/or other type of meat, or a mixture thereof, to which advantageously other elements have been added, also containing stabilizers.

According to the present invention, the stabilizers are based on vegetable fibers and constitute a percentage comprised between 1% and 3% of the mixture that makes up the meat-based layer 12.

The stabilizers are used to limit the natural absorption of substances from the environment and the leakage of liquids from the meat, so as to preserve its nutritional and organoleptic properties.

By way of example, ingredients such as salt, pepper, spices or other similar ingredients are added to the meat and/or mixture of meats.

According to the present invention, the apparatus 11 comprises a taking station 17 which provides a taking member 18 configured to take defined quantities of meat from a container 19 and to position it on the transport line 20 of the apparatus 11.

According to one form of embodiment, the taking member 18 can be an automated gripping arm, a suction pipe, a mobile belt located inside the container 19 which takes and transports the meat to the transport line 20 or other similar members.

According to one form of embodiment, the transport line 20 allows to transport the food product 10 being worked, disposing it horizontal so that a first side 40 faces downward.

According to one form of embodiment of the present invention, the transport line 20 can be moved continuously, or also providing temporary interruptions, if the food product 10 needs to remain at one of the stations of the apparatus 11.

According to one form of embodiment, the transport line 20 has wide apertures that allow access also from the first downward-facing side 40 of the food product 10 being worked.

By way of example, the transport line 20 can be a wide-mesh belt, a mobile net, holed and exuding bands, or other type similar thereto.

According to the invention, once positioned on the transport line 20, the meat is transported to the molding station 21 of the apparatus 11.

According to the present invention, the molding station 21 comprises at least a molding member 22, configured to shape the meat introduced into the molding station 21, so as to obtain meat-based layers 12 which have a flattened form with a first side 40 facing downward, a second side 41 facing upward and one or more connection edges 42, with a thickness comprised between 2 mm and 10 mm, preferably comprised between 3 mm and 6 mm.

The thickness is determined on each occasion depending on the sizes of the portion of food product 10 to be obtained, and also taking into consideration the total thickness of the food product 10 in its entirety.

Figure 2A:
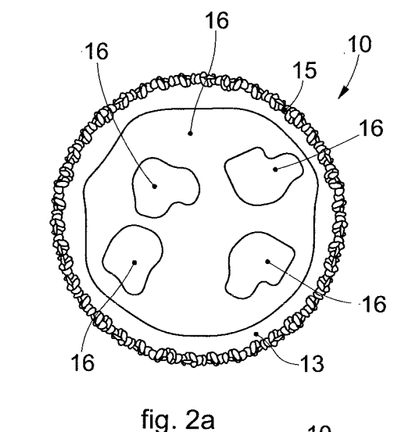
FIGS. 2a, 2b and 2c show three views from above of three food products according to the present invention.
Figure 2B:
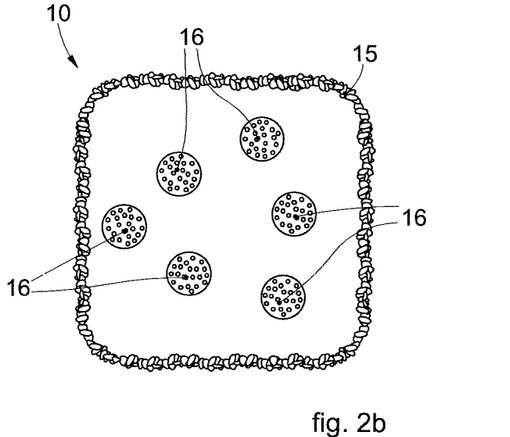
Figure 2C:
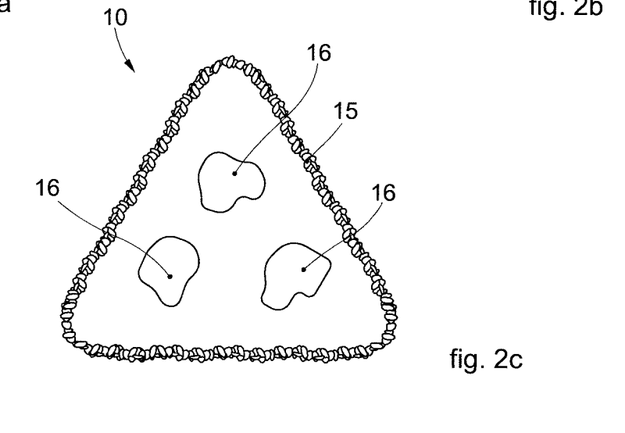

By way of example, the meat-based layer 12 exiting from the molding station 21 has a circular, elliptical, square, triangular or star shape, or other shape.

According to one form of embodiment, the apparatus 11 comprises a flattening station 45 configured to bring said meat-based layer 12 to the target thickness and to assure its target shape and size.

In this embodiment, the flattening station 45 can comprise water spray nozzles 46 configured to deliver water to avoid sticking, and a roller 47, coordinated with the transport line 20, to flat the meat-based layer 12, being the speed of the roller adjustable in relation to the transport line 20.

According to a variant, the flattening station 45 is coordinated with and/or can be a part of the molding station 21.

According to one form of embodiment of the present invention, the meat-based layer 12 exiting from the molding station 21 is transported by the transport line 20 to the covering station 23.

The covering station 23 comprises at least a delivery element 24 to deliver an impermeable covering mixture 25 configured to obtain an impermeable covering layer 13 on the surface of the meat-based layer 12.

Advantageously, the covering layer 13 covers the whole surface of the meat-based layer 12, so that its function of not allowing the liquids to pass from and into the meat is extended over the whole surface of the meat-based layer 12.

According to the present invention, the impermeable covering mixture 25 comprises water with functional ingredients in solution for a quantity comprised between 6% and 40% of the total quantity of the impermeable covering mixture 25.

According to possible forms of embodiment, the impermeable covering mixture 25 comprises water with functional ingredients in solution for a quantity comprised between 25% and 30%.

According to one form of embodiment of the present invention, the functional ingredients are applied in two steps of the process, applying first one or more functional ingredients and then the remaining functional ingredients.

The functional ingredients contained inside the impermeable covering mixture 25 are advantageously selected between protein and/or starch, possibly combined with alginates and Calcium, both in solution, which, once distributed in solution with the above concentrations on the surface of the meat-based layer 12, form an impermeable covering layer 13.

According to the present invention, the impermeable covering layer 13 has a thickness comprised between 0.1 mm and 1 mm, preferably comprised between 0.3 mm and 0.7 mm.

According to the present invention, the covering layer 13, once formed, does not allow either liquids or vitamins contained in the meat to leak from the meat-based layer 12, nor does it allow the meat to absorb other substances from the environment.

According to the invention, by the word impermeable we mean that the covering layer 13 acts as a complete or partial barrier at least against water and substances in solution therein.

According to one form of embodiment, the delivery element 24 delivers the impermeable covering mixture 25 so as to generate a mist consisting of the particles of the covering mixture 25 itself.

Advantageously, according to one form of embodiment of the invention, there can also be more than one delivery element 24, each of which with a rotating delivery head 26 able to increase the volume affected by the mist diffused in the space.

The meat-based layer 12, transiting through the mist, allows the particles of the impermeable covering mixture 25 to associate with the surface of the meat-based layer 12 itself, until an impermeable covering layer 13 is formed.

According to the present invention, the impermeable covering mixture 25 is distributed uniformly on the surface of the meat-based layer 12, adhering to the surface also through the apertures present in the transport line 20.

According to the invention, the covering layer 13 has the following characteristics:
- it retains the liquids contained in the meat, so as not to modify the consistency or the organoleptic characteristics of the layers 14, 15 and 16 applied in the successive stations of the apparatus 11;
- during frying, it protects the non-breaded surface of the meat from being burned;
- it improves the adhesion of the garnish 16 possibly distributed thereon.

According to the present invention, after having been covered by the covering layer 13, the meat-based layer 12 is transported by the transport line 20 to the breading preparation station 27.

According to one form of embodiment of the present invention, the preparation station 27 provides an element 28 to deliver batter 29, configured to distribute a layer of batter 14 from below onto the surface of the first downward-facing side 40 of the meat-based layer 12 covered by the impermeable covering layer 13.

According to one form of embodiment, the batter 29 is a suspension in water with one or more starch-based compounds, for example deriving from wheat, cereals, rice or other source.

According to the present invention, in order to increase the adhesion of the batter 29 on the covered meat-based layer 12 and also to render the food product 10 more appetizing, proteins are added to the solution.

Furthermore, according to the present invention, in order to guarantee a uniform distribution on the surface of the covered meat-based layer 12, the batter 29 has a ratio of dry ingredients to water comprised between 1:2 and 1:3.5.

The presence of the proteins in the batter 29, and the specific range of the ratio of dry ingredients to water, allow the batter 29 to adhere to the surface of the covered meat-based layer 12, having the time to bind with it and to form the layer of batter 14.

In particular, the quantities of the components of the solution are metered to prevent the batter 29 from flowing quickly across the surface of the covered meat-based layer 12 until it falls without having the time to adhere stably on it.

According to one form of embodiment, the covered meat-based layer 12 can also be entirely covered by the layer of batter 14.

According to one form of embodiment, the absorption and maintenance of the ratio of dry ingredients to water is managed by sucking up the excess batter 29 from the food product 10 being worked, and/or by adding water to the delivery tank of the batter 29.

According to the invention, delivering the batter 29 from below allows to cover a first downward-facing side 40 of the food product 10 being worked and also at least part of the connection edges 42 thereof, thanks to the natural tendency of the batter 29 to flow and adhere along the edges of the covered meat-based layer 12.

According to one form of embodiment, in order to prevent losses of batter 29, the delivery element 28 of the batter 29 is configured so as to deliver the necessary quantity to cover the first side 40 and at least part of the connection edges 42 of the covered meat-based layer 12, depending on the sizes and shape of said layer.

According to the present invention, after having deposited the layer of batter 29 on the covered meat-based layer 12, the food product 10 being worked is breaded in the breading station 30.

According to one form of embodiment of the present invention, the breaded layer 15 is obtained by distributing a combination of shredded ingredients on the first downward-facing side 40 of the food product 10 being worked by means of a distributor member 31, until the layer of batter 14 is at least partly covered.

According to one form of embodiment, given by way of example, the combination of shredded ingredients comprises bread, potatoes, rice, cereals, wheat or other ingredients that, once fried, have high organoleptic characteristics of crispness.

According to the present invention, the combination of shredded ingredients have grains with a size comprised between 1 mm and 15 mm.

During the subsequent frying step, the simultaneous presence of fine and thick grains allows the frying liquid to penetrate into the apertures and channels that are formed in the breaded layer 15.

This allows the frying liquid to reach and hence cook the internal zones of the breaded layer 15 too, so as to obtain a uniform golden color and great crispness.

According to the present invention, in order to guarantee a balanced proportion of the elements that make up the food product 10 and also a balanced consistency of the food product 10 in its entirety, the combination of the breaded layer 15 and the layer of batter 14 is comprised between 5% and 40% of the total weight of the entire food product 10.

According to one form of embodiment, the combination of the breaded layer 15 and the layer of batter 14 is comprised between 20% and 30% of the total weight of the entire of the entire product food 10.

According to a variant, the layer of batter 14 is comprised between 10% and 15% of the total weight of the entire of the entire product food 10.

According to a variant, the breaded layer 15 is comprised between 10% and 15% of the total weight of the entire of the entire product food 10.

In this case too, the excess quantity of the shredded ingredients is sucked up by a suction member.

According to the present invention, once the breaded layer 15 has been obtained, the food product 10 is inserted into the frying station 32, which comprises a fryer 33 configured to fry the food product 10 so as to obtain a uniform golden color.

According to one form of embodiment, the product is immersed in a frying liquid of vegetable origin, such as for example mixed seed oil, olive oil, or other types of vegetable oil.

According to the present invention, the food product 10 is fried at a temperature comprised between 140° C. and 200° C., advantageously around 185° C. for a time comprised between 30 seconds and 60 seconds, keeping the breaded layer 15 facing downward.

According to the present invention, keeping the food product 10 with the breaded layer 15 facing downward allows to have a uniform golden color of the breaded layer 15, a homogeneous adhesion of the layer to the covered meat-based layer 12 and also high organoleptic characteristics of crispness.

Frying the food product 10 with breaded layer 15 facing upward results in a not complete fried breadcrumb, because the food product 10 starts to floating in the fryer; in the present invention this technical problem has been addressed and overcome by frying the food product 10 with the breaded layer 15 facing downward.

According to the present invention, in this case, the food product 10 does not float in the fryer anymore. Moreover, since the breaded layer 15 is not in direct contact with the lower internal surface of the fryer 33, it is not subjected to a violent cooking through contact such as to cause burning on the breaded layer 15 and/or cause portions of the breaded layer 15 to detach from the food product 10.

According to the invention, since the food product 10 were fried with the breaded layer 15 facing downward, the liquids contained in the batter 29 and/or the ingredients of the breaded layer 15, coming out in the form of steam and/or bubbles keep the food product 10 not in direct contact with lower internal surface of the fryer 33.

In fact, said liquids generate a physical barrier near the zone where they remain during frying.

According to the invention, thanks to the covering layer 13 and frying the food product 10 with the breaded layer 15 facing downward, a product is obtained that keeps the nutritional characteristics of the meat-based layer 12 and at the same time a very crisp breaded layer 15, uniformly golden.

According to the invention, in order to complete the cooking of the meat-based layer 12, the food product 10 is turned and inserted in the cooking station 34, which provides an oven 35 configured both to cook the food product 10 and at the same time to suck in the steam generated by the food product 10 itself.

According to the invention, the steam generated by the food product 10 is sucked in from inside the oven 35 by a suction member 36.

According to the invention, the cooking in the oven 35 is carried out keeping the food product 10 with the breaded layer 15 facing upward, and reaching a temperature inside the meat-based layer 12 higher than 75° C.

In the cooking step in the oven 35, the food product 10 is kept with the breaded layer 15 facing upward to prevent the steam exiting from the breaded layer 15 from remaining under the food product 10, making it wet and therefore not very firm.

Following cooking in the oven 35, the food product 10 obtained is a high-protein food product 10 which, having a breaded layer 15 on one side and along its connection edges 42, is firmer than known food products.

Furthermore, thanks to the surface that is left without breading, it is possible to distribute upon it a garnish 16 which not only enriches the final product but also hides the meat-based layer 12.

In this way, the garnished product has the appearance of a known pizza, but inside it contains the meat-based layer 12 which replaces the pizza dough.

This configuration allows to obtain a product that has the advantages and practicality of known pizzas, but at the same time is able to supply, especially to children, the proteins and vitamins contained in meat needed for their growth.

After cooking in the oven 35, according to one form of embodiment of the present invention, the food product 10 thus obtained can be transferred to a freezing station 37 of the apparatus 11 configured to freeze the food product 10 to a temperature equal to or less than −20° C.

According to one form of embodiment of the present invention, the frozen food product 10 is transferred to a garnishing station 38 which includes devices 39 to deliver the garnishing ingredients able to provide one or more precooked or fresh and/or frozen ingredients based on dairy products, vegetables, greens, salami, spices or various other ingredients.

According to one form of embodiment of the present invention, the garnish 16 is distributed on the surface of the meat-based layer 12 covered with the impermeable covering layer 13 and left uncovered by the layer of batter 14 until the meat-based layer 12 is covered, partly or completely.

According to one form of embodiment, the garnish 16 is distributed immediately after cooking in the oven 35, and then the garnished food product 10 is frozen in the freezing station 37 with its own garnish 16.

According to the invention, it is therefore possible to obtain food products 10 with or without garnish 16. In particular, once frozen, the food products 10 without garnish 16 can be distributed on the market and/or transported to other places where they can be finished, and where they are possibly garnished and/or cooked and/or again frozen.

When the food product 10 with the garnish 16 is inserted in the oven 35, the bottom of the food product 10, such as the breaded layer 15, gets crispy, and the uncovered side gets soft and liquid, as result of the presence of the garnish 16.

It is clear that modifications and/or additions of parts may be made to the food product, the apparatus to obtain it and the corresponding method as described heretofore, without departing from the field and scope of the present invention.

It is also clear that, although the present invention has been described with reference to some specific examples, a person of skill in the art shall certainly be able to achieve many other equivalent forms of food product, the apparatus to obtain it and the corresponding method, having the characteristics as set forth in the claims and hence all coming within the field of protection defined thereby.

The invention claimed is:

1. A system to make a food product, wherein the food product comprises:
   a meat-based layer, or mixture of meats-based layer, with a first side facing downward, a second side facing upward and one or more connection edges defined between said first side and said second side, wherein the meat-based layer comprises an impermeable covering layer disposed on the entire surface of said meat-based layer;
   a layer of batter, covering only said first side and at least part of said connection edges of said meat-based layer; and
   a breaded layer, distributed on at least part said layer of batter;
   wherein the system comprises:
   a meat taking station, configured to take meat, or a mixture of one or more types of meat, from one or more containers;
   a molding station to mold the meat-based layer;
   a covering station to cover said meat-based layer, configured to distribute an impermeable covering mixture over the entire surface of said meat-based layer in order to obtain the impermeable covering layer;
   a breading preparation station, configured to distribute the layer of batter only on said first side, facing downward, and at least part of the connection edges of said meat-based layer;
   a breading station, configured to distribute shredded ingredients on at least part of said layer of batter until a breaded layer is obtained;
   a frying station, configured to fry said food product, keeping said breaded layer facing downward; and
   a cooking station in an oven, configured to finish the cooking of said meat-based layer, keeping said breaded layer facing upward,
   wherein said breading preparation station comprises a batter delivering device disposed below said food product being worked, said batter delivering device being configured to distribute a batter from down onto said first side facing downward and at least part of said connection edges of said food product being worked, until a layer of batter is obtained.

2. The system according to claim 1, further comprising:
   a garnishing station, also remote, configured to distribute the ingredients of said garnish at least on part of the surface of said meat-based layer uncovered by said layer of batter and said breaded layer; and
   a freezing station, configured to freeze said food product after cooking in said oven or after having been garnished.

3. The system according to claim 1, further comprising a flattening station configured to bring said meat-based layer to the target thickness and to assure its target shape and size.

4. A method to obtain a food, wherein the food product comprises:

a meat-based layer, or mixture of meats-based layer, with a first side facing downward, a second side facing upward and one or more connection edges defined between said first side and said second side, wherein the meat-based layer comprises an impermeable covering layer disposed on the entire surface of said meat-based layer;

a layer of batter, covering only said first side and at least part of said connection edges of said meat-based layer; and a breaded layer, distributed on at least part said layer of batter;

wherein the method comprises:

a step of taking meat or a mixture of meats;

a step of molding said meat or mixture of meats to define a meat-based layer with a first side facing downward, a second side facing upward and one or more connection edges defined between said first side and said second side;

a step of covering the whole surface of said meat-based layer with an impermeable covering mixture;

a step of distributing a batter only on said first side, facing downward, and at least part of said connection edges of said meat-based layer until a layer of batter is obtained;

a breading step during which a combination of shredded ingredients is distributed at least on said layer of batter until a breaded layer is obtained;

a frying step keeping said breaded layer facing downward; and a cooking step in an oven reaching a temperature inside said meat-based layer higher than 75° C. and keeping said breaded layer facing upward, wherein said step of distributing a batter provides that said batter is distributed only on said first side, facing downward, and at least part of said connection edges of said meat-based layer.

5. The method according to claim 4, further comprising a garnishing step during which one or more ingredients are distributed at least on part of the surface of said meat-based layer, uncovered by said layer of batter and said breaded layer.

6. The method according to claim 4, wherein said molding step is combined with a step of flattening during which said meat-based layer is brought to a target thickness, shape and size.

7. The method according to claim 5, wherein said molding step is combined with a step of flattening during which said meat-based layer is brought to the target thickness, shape and size.

8. The method according to claim 4, wherein said molding step is combined with a step of flattening during which said meat-based layer is brought to the target thickness, shape and size.

9. The method according to claim 5, wherein said molding step is combined with a step of flattening during which said meat-based layer is brought to the target thickness, shape and size.

\* \* \* \* \*